R. T. M. WELLS.
Car Starter.
2 Sheets—Sheet 1.
No. 56,301.
Patented July 10, 1866.
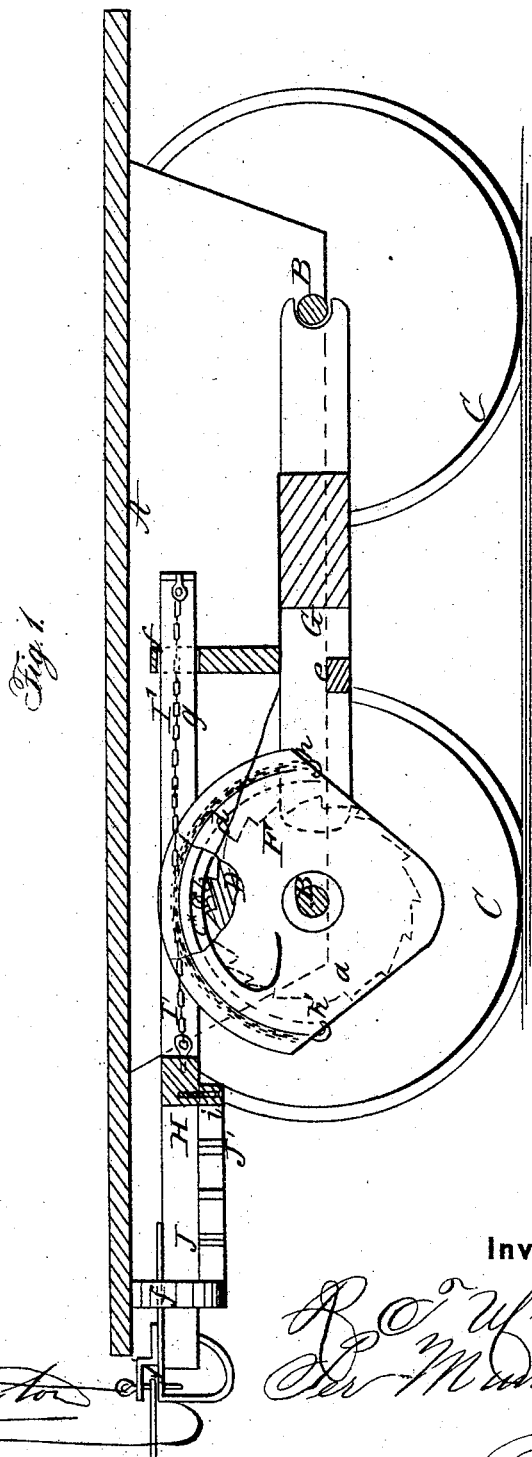
Witnesses:
Inventor:

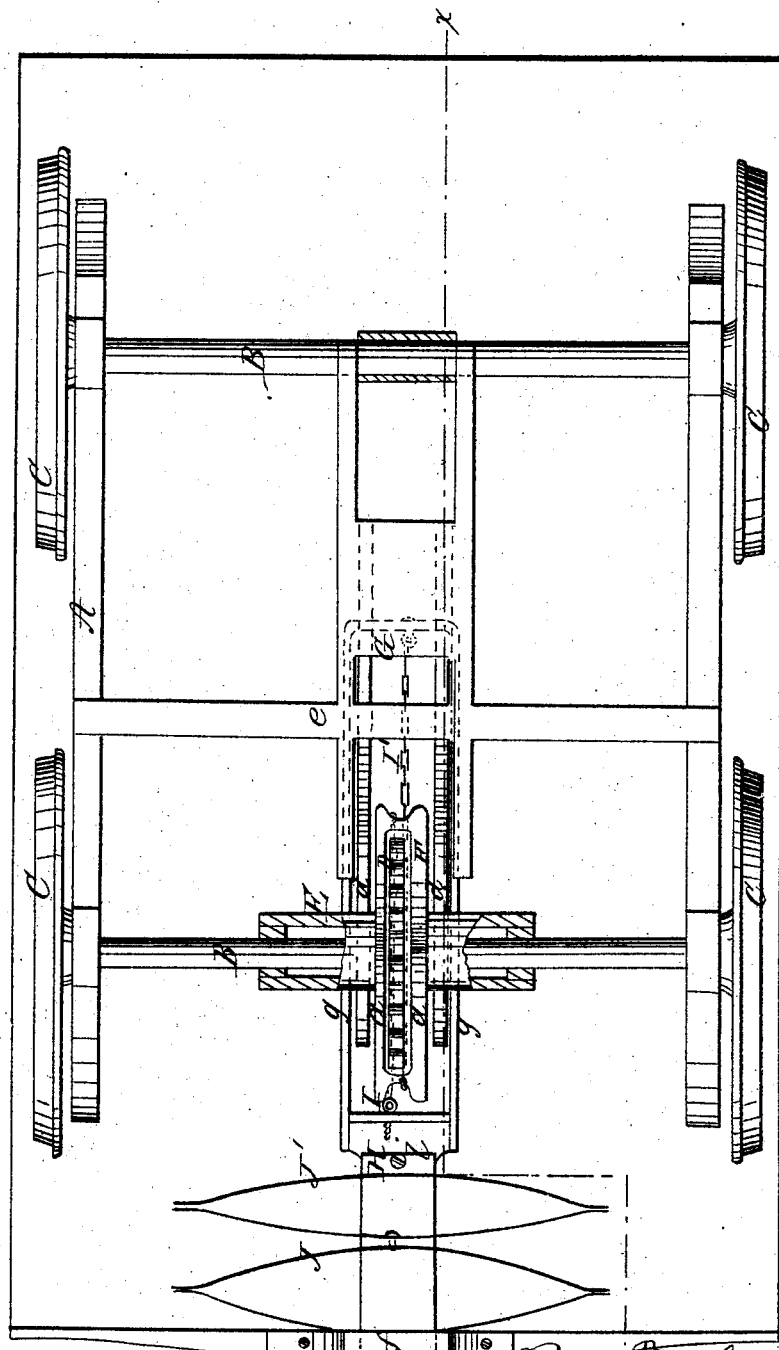

UNITED STATES PATENT OFFICE.

R. T. M. WELLS, OF ROXBURY, MASSACHUSETTS.

IMPROVEMENT IN RAILROAD-CARS.

Specification forming part of Letters Patent No. 56,301, dated July 10, 1866.

*To all whom it may concern:*

Be it known that I, R. T. M. WELLS, of Roxbury, in the county of Norfolk and State of Massachusetts, have invented a new and Improved Means for Facilitating the Starting of Horse-Railroad Cars; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, Fig. 2; Fig. 2, an inverted plan of the same.

Similar letters of reference indicate like parts.

This invention relates to an improvement on a means for facilitating the starting of horse-cars which was patented by me January 3, 1865.

The present invention has for its object the obtaining of a more simple arrangement of parts to effect the same result as in the original plan, and one which will be more compact and not liable to interfere or come in contact with obstructions on the road.

A represents the track or lower part of a railroad-car, B B the axles, and C the wheels thereof. These parts may be of usual construction, and therefore require no particular description.

On the front axle, B, there is firmly keyed a ratchet, D, and a sleeve, E, is fitted loosely on said axle, and has a segment, F, secured to it, said segment being hollow or formed of two plates, $a\ a$, connected together by screws or otherwise to form a box to inclose the ratchet D. This segment and sleeve are allowed to turn freely independent of the ratchet when the latter is not connected with the former, and a pin, $b$, passes transversely through the segment, oblong curved slots $c$ being made in the plates $a\ a$ for the pin to pass through. This pin $b$ is attached to a swinging plate, $c^*$, in the segment E, and has springs $d\ d$ bearing upon its ends to keep it engaged with the ratchet D, (see Fig. 1,) said springs being attached to a short longitudinal frame, G, the front end of which is attached to a cross-bar, $e$, of the truck, and the rear end fitted loosely on the rear axle, B.

H represents a sliding bar, which is fitted and works in suitable guides $f f$, one of which is at the front end of the platform of the car and the other on the front end of the frame G. The rear part of this sliding bar is formed of a metal bar bent so as to comprise three sides of a quadrangle, the two sides $g\ g$ of which work in the rear guide, $f$, one at each side of the upper part of the segment F. This sliding bar H has two chains, I I', attached to it, one in front and the other at the rear of the segment F. The chain I, which is attached to bar H in front of the segment, extends over the periphery of the same, and is secured to its rear end, as shown at $h$, and the other chain, I', which is attached to the bar H at the rear of the segment, passes over the periphery of the segment to the front of the same, where it is secured at $h'$. (See Fig. 1.)

J J' are two elliptic springs, one of which is secured to the bar H, as shown at $i$, and the other attached to the guide $f$ at the front end of the platform.

The draft-pole of the car is attached to the front end of the sliding bar H, a clevis, $j$, being at the front end of bar H to sustain the draft-pole. In starting the car the bar H will be drawn out and the chain I will turn the segment F in the direction indicated by arrow 1, and in consequence of the pin $b$ being made to engage with the ratchet D by means of the springs $d\ d$, the front axle and wheels will also be turned. The bar H cannot be drawn out beyond a certain extent on account of a stop, K, on the bar coming in contact with the guide $f$ at the front end of the platform. After the car is thus started the draft, of course, will be comparatively easy or light, commensurate with the power of the team, the great difficulty being in starting. The springs J J bring the bar H back to its original position whenever the speed of the team is checked, the chain I' drawing the segment F back.

The segment, it will be seen, is above the front axle, B, not much of it being below, and hence it will not come in contact with obstructions on the line of the road. The teeth of the ratchet D are allowed to slip freely underneath the pin $b$ when the ratchet is rotating under the draft-movement of the car.

Having thus described my invention, I claim as new and desire to secure by Letters Patent—

The ratchet D, keyed on the front axle, B, of the truck and encompassed by a segment, F, placed loosely on said axle, in combination with the pin or pawl b, slide-bar H, springs J J', one or more, and the chains I I', all arranged to operate in the manner substantially as and for the purpose set forth.

The above specification of my invention signed by me this 6th day of March, 1866.

R. T. M. WELLS.

Witnesses:
ABRAHAM A. DAME,
WILLIAM A. DAME.